United States Patent
Rose et al.

(10) Patent No.: US 10,620,967 B2
(45) Date of Patent: Apr. 14, 2020

(54) CONTEXT-BASED PROGRAM SELECTION

(71) Applicant: LENOVO (Singapore) PTE, LTD., New Tech Park (SG)

(72) Inventors: Amy Leigh Rose, Chapel Hill, NC (US); John Scott Crowe, Durham, NC (US); Gary David Cudak, Wake Forest, NC (US); Jennifer Lee-Baron, Morrisville, NC (US); Nathan J. Peterson, Durham, NC (US); Bryan Loyd Young, Tualatin, OR (US)

(73) Assignee: Lenovo (Singapore)PTE LTD, New Tech Park (SG)

( * ) Notice: Subject to any disclaimer, the term of this patent is extended or adjusted under 35 U.S.C. 154(b) by 620 days.

(21) Appl. No.: 14/945,223

(22) Filed: Nov. 18, 2015

(65) Prior Publication Data
US 2017/0139553 A1    May 18, 2017

(51) Int. Cl.
*G06F 9/445* (2018.01)
*G06F 21/62* (2013.01)
*G06F 3/0482* (2013.01)

(52) U.S. Cl.
CPC .......... *G06F 9/445* (2013.01); *G06F 9/44505* (2013.01); *G06F 21/6218* (2013.01); *G06F 3/0482* (2013.01)

(58) Field of Classification Search
CPC ........................... G06F 3/0482; G06F 21/6218
See application file for complete search history.

(56) References Cited

U.S. PATENT DOCUMENTS

| | | | | |
|---|---|---|---|---|
| 7,761,471 B1* | 7/2010 | Lee | .......... | G06F 16/93 707/783 |
| 8,365,081 B1* | 1/2013 | Amacker | .......... | G06Q 10/10 705/27.1 |
| 2002/0059236 A1* | 5/2002 | Satoh | .......... | G06F 21/6218 |
| 2003/0112273 A1* | 6/2003 | Hadfield | .......... | G06Q 10/10 715/751 |
| 2005/0097440 A1* | 5/2005 | Lusk | .......... | G06Q 10/10 715/758 |
| 2007/0150299 A1* | 6/2007 | Flory | .......... | G06Q 10/10 705/51 |
| 2008/0005685 A1* | 1/2008 | Drews | .......... | G06F 3/0481 715/764 |
| 2009/0006936 A1* | 1/2009 | Parker | .......... | G06F 17/24 715/200 |
| 2009/0199090 A1* | 8/2009 | Poston | .......... | G06F 16/907 715/255 |
| 2009/0204648 A1* | 8/2009 | Best | .......... | G06F 11/1451 |
| 2009/0217352 A1* | 8/2009 | Shen | .......... | G06F 17/30038 726/3 |
| 2011/0022849 A1* | 1/2011 | Berengoltz | .......... | G06F 21/62 713/189 |

(Continued)

*Primary Examiner* — William L Bashore
*Assistant Examiner* — Nathan K Shrewsbury
(74) *Attorney, Agent, or Firm* — Kunzler Bean & Adamson

(57) ABSTRACT

Apparatuses, systems, methods, and program products are disclosed for context-based program selection. A resource module receives a resource selection. A characteristic module determines at least one characteristic of the resource. The at least one characteristic includes either content within the resource and/or metadata associated with the resource. A program module selects a program to open the resource based on the at least one characteristic of the resource.

16 Claims, 5 Drawing Sheets

(56) References Cited

U.S. PATENT DOCUMENTS

| | | | | |
|---|---|---|---|---|
| 2011/0106795 | A1* | 5/2011 | Maim | G06F 17/2229 |
| | | | | 707/728 |
| 2011/0246753 | A1* | 10/2011 | Thomas | G06F 21/56 |
| | | | | 713/1 |
| 2012/0110445 | A1* | 5/2012 | Greenspan | G06F 17/2288 |
| | | | | 715/256 |
| 2014/0274137 | A1* | 9/2014 | Carlsson | H04W 4/025 |
| | | | | 455/456.2 |
| 2014/0283142 | A1* | 9/2014 | Shepherd | G06F 3/0482 |
| | | | | 726/30 |
| 2015/0271267 | A1* | 9/2015 | Solis | H04L 67/1097 |
| | | | | 709/213 |
| 2015/0310072 | A1* | 10/2015 | Dietz | G06F 16/22 |
| | | | | 707/741 |
| 2015/0379244 | A1* | 12/2015 | Pathak | G06F 21/10 |
| | | | | 726/28 |
| 2016/0133254 | A1* | 5/2016 | Vogel | G06F 3/167 |
| | | | | 704/275 |
| 2016/0283406 | A1* | 9/2016 | Linga | G06F 16/93 |
| 2016/0337382 | A1* | 11/2016 | Thomas | G06F 21/56 |

* cited by examiner

CONTEXT-BASED PROGRAM SELECTION

FIELD

The subject matter disclosed herein relates to opening resources in programs and more particularly relates to determining a program to open a resource based on context.

BACKGROUND

Description of the Related Art

An operating system may open resources such as files, URLs, etc., in programs that have been set as the default programs by the operating system. For example, the operating system may open files with default programs designated to open files that have particular file extensions. A default program for a resource, however, may not be the most appropriate or the desired program to use to open the resource because the default program set by the operating system may not be determined based on the content of the resource or other contextual data associated with the resource.

BRIEF SUMMARY

An apparatus for context-based program selection is disclosed. A method and computer program product also perform the functions of the apparatus. In one embodiment, an apparatus includes a processor and a memory that stores code executable by the processor. The executable code, in one embodiment receives a resource selection. In a further embodiment, the executable code determines at least one characteristic of the resource. The at least one characteristic may include either content within the resource and/or metadata associated with the resource. The executable code, in another embodiment, selects a program to open the resource based on the at least one characteristic of the resource.

In one embodiment, the memory further includes code executable by the processor to determine one or more types of content within the resource. The program selected to open the resource may be selected based on the determined one or more types of content within the resource. In various embodiments, the program selected to open the resource includes a program selected by a user to open resources that include content of a predefined type.

In one embodiment, the memory further includes code executable by the processor to determine, from the metadata, an author of the resource. In certain embodiments, the resource is opened in the selected program in edit mode in response to the resource being selected by the author of the resource and the resource is opened in the selected program in read-only mode in response to the resource being selected by a different user.

In one embodiment, the memory further includes code executable by the processor to determine, from the metadata, a program selected by the author of the resource such that the author-selected program is selected to open the resource. In another embodiment, the memory further includes code executable by the processor to determine, from the metadata, a program that was used to create the resource such that the program that was used to create the resource is selected to open the resource.

In one embodiment, the memory further includes code executable by the processor to determine, from the metadata, a storage location for the resource such that the program selected to open the resource is selected based on the storage location of the resource. In another embodiment, the memory further includes code executable by the processor to determine, from the metadata, a most recently used program used to open the resource such that the program selected to open the resource is the most recently used program.

In a further embodiment, the memory further includes code executable by the processor to determine, from the metadata, a program designated as the selected program to open the resource. In another embodiment, the memory further includes code executable by the processor to determine, from the metadata, the program selected to open the resource based on one or more of an operating system and a device that is used to select the resource.

In various embodiments, the resource includes a hyperlink and the memory further includes code executable by the processor to determine, from the metadata associated with the hyperlink, a program selected to open the hyperlink. In one embodiment, the content within the resource may include images, formatted text, unformatted text, videos, source code, hyperlinks, or the like.

A method, in one embodiment, includes receiving, by use of a processor, a resource selection. In a further embodiment, the method includes checking at least one characteristic of the resource. The at least one characteristic may include either content within the resource and/or metadata associated with the resource. In various embodiments, the method includes selecting a program to open the resource based on the at least one characteristic of the resource.

In certain embodiments, the method includes determining one or more types of content within the resource. The program selected to open the resource may be selected based on the determined one or more types of content within the resource. The program selected to open the resource may include a program selected by a user to open resources that include content of a predefined type.

In one embodiment, the method includes determining, from the metadata, an author of the resource such that the resource is opened in the selected program in edit mode in response to the resource being selected by the author of the resource and the resource is opened in the selected program in read-only mode in response to the resource being selected by a different user.

In a further embodiment, the method includes determining, from the metadata, a program that was used to create the resource such that the program that was used to create the resource is selected to open the resource. In another embodiment, the method includes determining, from the metadata, a storage location for the resource such that the program selected to open the resource is selected based on the storage location of the resource.

In one embodiment, the method includes determining, from the metadata, a most recently used program used to open the resource such that the program selected to open the resource includes the most recently used program. In a further embodiment, the method includes determining, from the metadata, a program designated as the selected program to open the resource. In one embodiment, the designated program is based on either an operating system and/or a device that is used to select the resource.

In one embodiment, a program product includes a computer readable storage medium that stores code executable by a processor. In certain embodiments, the executable code includes code to perform receiving a resource selection. In another embodiment, the executable code includes code to perform checking at least one characteristic of the resource. In one embodiment, the at least one characteristic includes either content within the resource and/or metadata associated with the resource. In a further embodiment, the executable code includes code to perform selecting a program to open the resource based on the at least one characteristic of the resource.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
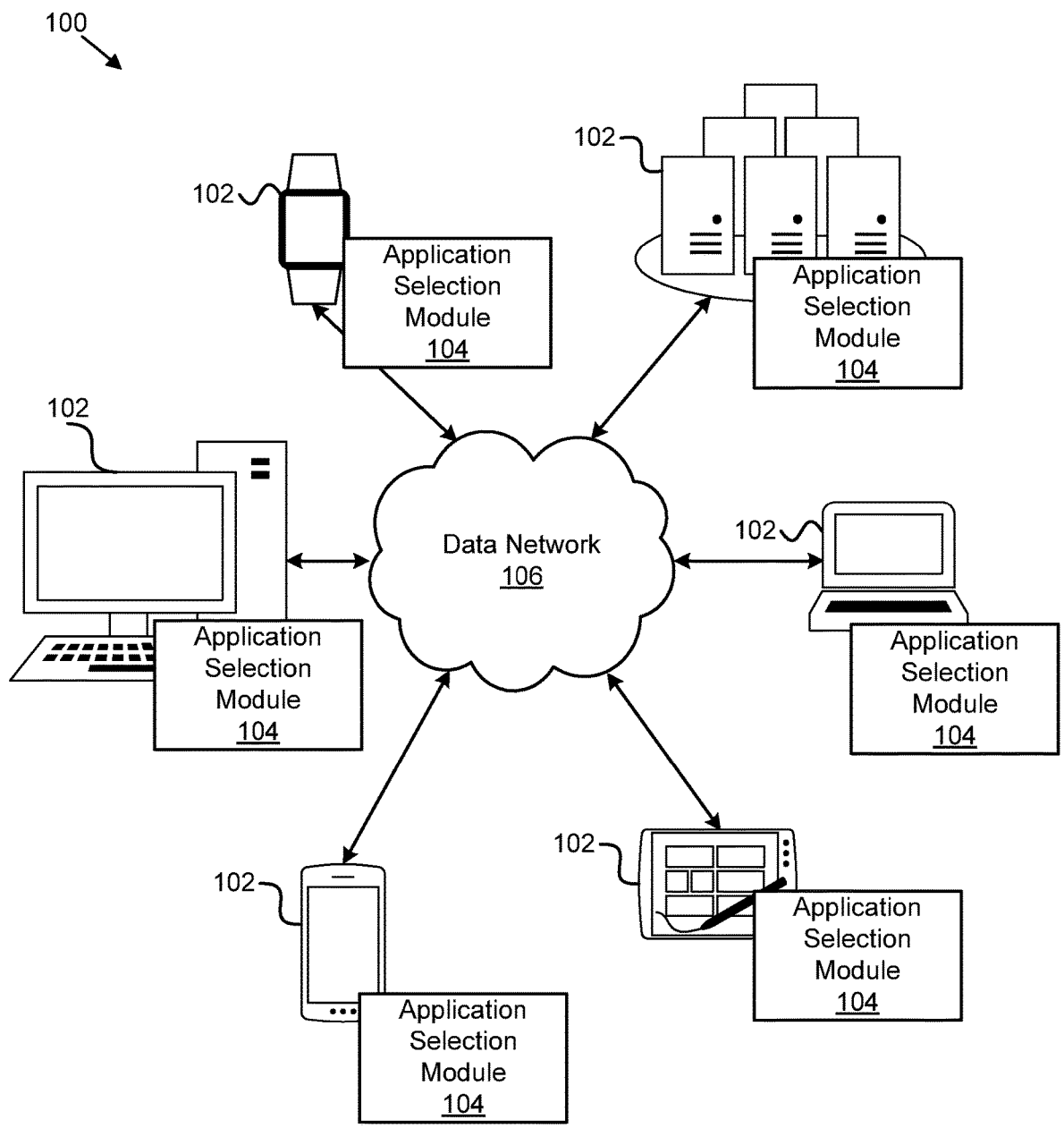
FIG. 1 is a schematic block diagram illustrating one embodiment of a system for context-based program selection.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for context-based program selection. In one embodiment, the system 100 includes information handling devices 102, application selection modules 104, and data networks 106. In certain embodiments, even though a specific number information handling devices 102, application selection modules 104, and data networks 106 are depicted in FIG. 1, one of skill in the art will recognize that any number of information handling devices 102, application selection modules 104, and data networks 106 may be included in the system 100 for context-based program selection.

In one embodiment, the information handling devices 102 include desktop computers, laptop computers, personal digital assistants (PDAs), tablet computers, smart phones, smart televisions (e.g., televisions connected to the Internet), set-top boxes, game consoles, or the like. In some embodiments, the information handling devices 102 include wearable devices, such as smart watches, fitness bands, optical head-mounted displays, or the like.

In certain embodiments, the information handling devices 102 include servers, blade servers, virtual servers, cloud servers, servers of a data center, network servers, remote servers, or the like. The servers may be configured as application servers, email servers, database servers, file servers, game servers, home servers, media servers, web servers, and/or the like. In certain embodiments, the servers are communicatively coupled to other information handling devices 102 via the data network 106 such that the information handling devices 102 may store and/or access data on the servers as it relates to the application selection module 104. For example, servers may store applications, files, programs, metadata, databases, registries, log files, or the like.

The information handling devices 102 may include various storage devices for storing various electronic resources. For example, the information handling devices 102 may store text files, images, videos, source code, PDF files, music files, hyperlinks, or the like. The storage devices may include memory such as flash storage media, hard disk drives, removable storage media, tape drives, solid-state storage media, read-only memory ("ROM"), random access memory ("RAM"), or the like. The information handling devices 102 may be installed with an operating system, such as Microsoft Windows®, Windows Server®, Apple OS X®, various Linux® distributions, Android®, iOS®, Windows Mobile®, or the like. Furthermore, the information handling devices 102 may include a file system that organizes, arranges, or otherwise manages storage and access of various resources stored on the information handling devices 102.

The information handling devices 102, in certain embodiments, include one or more installed programs that are configured to process resources or files of various types—images, text documents, PDF documents, music files, videos, hyperlinks, etc. For example, a smart phone 102 may include a text messaging application, an email application, a music player, a video player, a photo viewer, a social media application, a web browser, or the like. One of skill in the art will realize the various programs that may be used to process resources on an information handling device 102.

In one embodiment, the application selection module 104 is configured to receive a resource selection in response to user input. The application selection module 104, in a further embodiment, is configured to check at least one characteristic of the resource. The at least one characteristic may include content within the resource and/or metadata associated with the resource. In various embodiments, the application selection module 104 is configured to select a program to open the resource based on the at least one characteristic of the resource. The application selection module 104, in one embodiment, includes various modules that perform the functions of the application selection module 104, as described below with reference to FIGS. 2 and 3.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
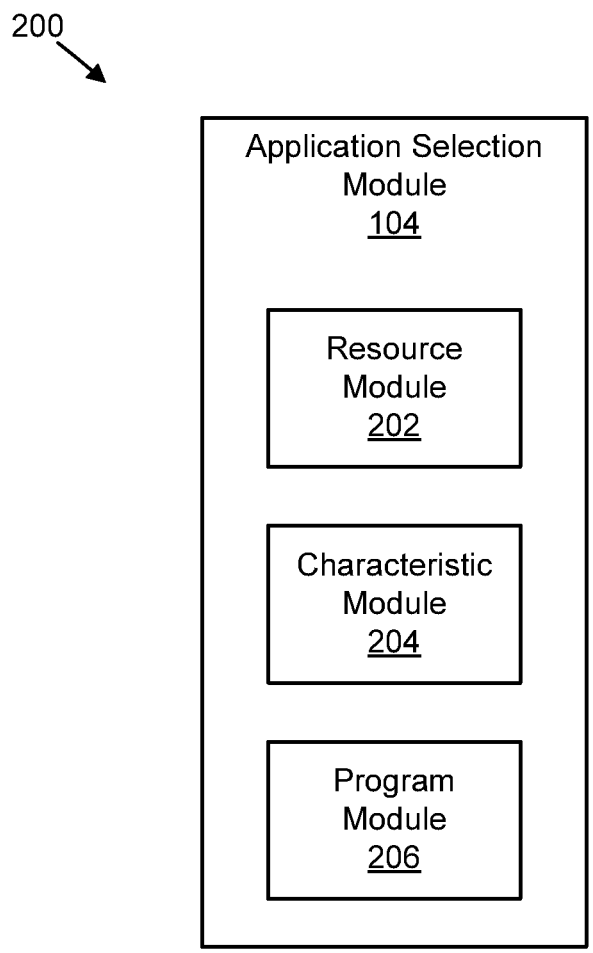
FIG. 2 is a schematic block diagram illustrating one embodiment of a module for context-based program selection.

FIG. 2 is a schematic block diagram illustrating one embodiment of a module 200 for context-based program selection. In one embodiment, the module 200 includes an embodiment of an application selection module 104. The application selection module 104, in various embodiments, includes one or more of a resource module 202, a characteristic module 204, and a program module 206, which are described in more detail below.

In one embodiment, the resource module 202 receives a resource selection. The resource selection may be associated with a command to open the resource. In some embodiments, the resource selection may be in response to user input. For example, a user may use a graphical user interface ("GUI") to select a file by double-clicking or tapping an icon representing the file in the GUI. In another example, a user may use a command line interface, such as a bash shell, a terminal, a command shell, etc. to select a file by using an open command with the filename. One of skill in the art will recognize the various ways that a user may select a resource to open. In response to the resource being selected, the resource module 202 may receive the name of the resource, the location of the resource, the location of metadata associated with the resource, or the like, which may be used in determining which program to use to open the resource as described below.

The selected resource, in certain embodiments, may include a text file, an image file, a video file, a music file, an animation file, a presentation file, a spreadsheet file, or the like. The selected resource, in some embodiments, may be a hyperlink, a file transfer protocol ("FTP") link, an email link, a phone number link (e.g., Google Voice®, Skype®, etc.), a phone or video conference link, (e.g., Microsoft Lync®, Skype®, etc.), a web page (e.g., a *.html file, a *.php file, or the like), a source code file (e.g., a *.cpp file, a *.cs file, a *.jar file, etc.), or the like. One of skill in the art will recognize the various types of resources that may be stored, accessed, read, viewed, created, opened, or the like on a computer.

In one embodiment, the characteristic module 204 determines one or more characteristics associated with the resource. The one or more characteristics may include the content of the resource. In some embodiments, the characteristic module 204 determines the content within the resource and/or the types of content within the resource. For example, a selected file may include formatted and/or unformatted text, tags, hyperlinks, images, videos, music, or the like. The selected file may also include a multimedia file, such as an image file, a video file, a music file, or the like within its content.

In one embodiment, the characteristic module 204 checks or references metadata associated with the resource to determine one or more characteristics of the resource. As used herein, metadata associated with the resource may refer to metadata stored together with the resource, metadata for the resource that is stored in an operating system specific location, such as the registry, metadata stored in a remote network location, such as the cloud, or the like. The metadata, in one embodiment, includes data fields associated with the resource, such as data describing the author/creator of the resource, timestamps describing when the resource was created/modified/last saved, the location of the resource in the file system, the types of content within the resource, a designated program that the resource is opened with, or the like.

The program module 206, in one embodiment, is configured to select a program, and/or a particular version of the program, to open the resource based on the characteristics of the resource. In certain embodiments, the program module 206 determines an appropriate program to open the resource based on the content within the resource and/or the metadata associated with the resource. In one embodiment, the selected program may be dynamically determined in response to the resource being selected. For example, after the resource module 202 determines a file is selected and the characteristic module 204 determines the characteristics of the file, the program module 206 may select a program to open the file from one or more available programs on the device used to open the file. In another embodiment, the program module 206 may determine a default program for the selected resource according to one or more programs that have been pre-selected by a user to handle resources that include certain types of content. For example, a user may designate Microsoft Word® to be the default program to handle files that contain formatted text and a more basic text editor to handle files that contain unformatted text.

Therefore, unlike traditional systems that may select programs to open resources based primarily on the extension of the resource (e.g., a *.docx file may by default open in Microsoft Word®, or another program that has been set up as the default program associated with the *.docx extension) such that all resources with the same extension are opened in the same program, the subject matter disclosed herein selects programs to open resources based on the context of the resource—the content within the resource and/or metadata associated with the resource. Accordingly, instead of opening a resource based solely on the resource's extension, the resource may be opened in an appropriate program configured to handle the contents of the resource and/or according to the metadata of the resource.

Figure 3:
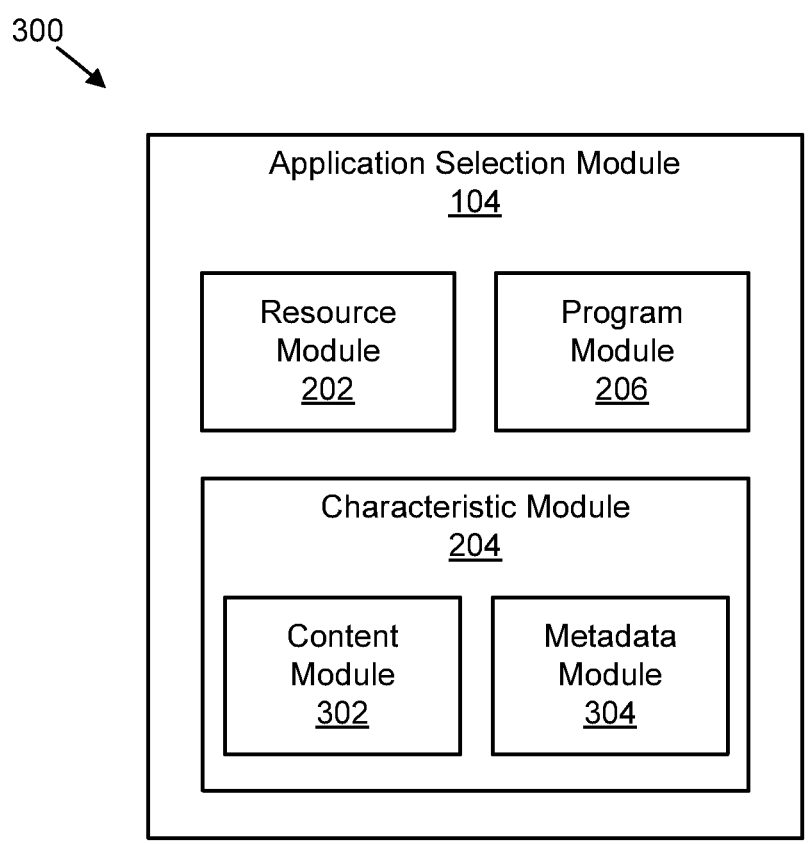
FIG. 3 is a schematic block diagram illustrating one embodiment of another module for context-based program selection.

FIG. 3 is a schematic block diagram illustrating one embodiment of another module 300 for context-based program selection. In one embodiment, the module 300 includes an embodiment of an application selection module 104. The application selection module 104 may include one or more of a resource module 202, a characteristic module 204, and a program module 206, which may be substantially similar to the resource module 202, characteristic module 204, and program module 206 described above with reference to FIG. 2. The application selection module 104, in certain embodiments, includes one or more of a content module 302 and a metadata module 304, which are described in more detail below.

In one embodiment, the content module 302 determines the content and/or the types of content within the selected resource. In order to determine the types of content within the resource, the content module 302 may process the resource when the resource is selected to be opened. For example, in response to a user double-clicking a file, the content module 302 may process, scan, parse, or the like the file to determine the types of content within the file, and the program module 206 may select a program to open the file based on the content types within the file.

In one embodiment, the content module 302 processes the resource when the resource is created, modified, saved, accessed, or the like. For example, the content module 302 may process a text file to determine the contents of the text file (e.g., whether the text file includes formatted text, unformatted text, images, etc.) as the text file is being created (e.g., the content module 302 may monitor the types of content in a file while it is being edited), when the text file is saved (e.g., the content module 302 may process a file in response to a save command to determine content types within the file), or the like. In such an embodiment, the content module 302 may store information regarding the types of content within the resource in metadata associated with the resource. For example, the content module 302 may specify that a file includes formatted text, including font types, and images (e.g., *.jpg images, *.png images, etc.) in metadata associated with the file, which may subsequently be used, read, or received by the metadata module 304 and used by the program module 206 to select a program to open the file instead of requiring the content module 302 to process the file every time the file is selected.

In one embodiment, the metadata module 304 is configured to check one or more metadata files, tables, logs, etc., associated with the selected resource in response to the resource being selected. As mentioned above, the metadata may be stored together with the resource, may be stored in a registry of an operating system, may be stored in a local and/or remote data store, or the like. In one embodiment, the metadata includes a plurality of data fields that each include information or data describing an element of the resource.

In one embodiment, the metadata module 304 checks an author or creator data field of the metadata to determine an ID for an author or creator of the selected resource. In one embodiment, if the determined ID matches the ID of the user who opened the resource, e.g., the user that is logged-in to the system, the program module 206 may open the determined program in a mode with elevated privileges. For example, if the metadata module 304 determines that a user that selects a text file is the creator of the file, the program module 206 may open the text file in Microsoft Word® in edit mode so that the user can edit the document. On the other hand, if the metadata module 304 determines that a user that selects a text file is not the creator of the file, the program module 206 may open the text file in Microsoft Word® in read-only mode so that the user cannot edit the document.

In a further embodiment, if the metadata module 304 determines that the metadata includes an author or creator field for the selected resource, the metadata module 304 may check a field of the metadata associated with a program listing defined by the author of the resource that lists the programs that the program module 206 should use to open the resource. In one embodiment, the program listing is in an ordered or ranked list such that if the program module 206 determines that a system does not have a higher-ranked program installed, or the program is otherwise unavailable, the program module 206 may move to the next highest-ranked program, and so on. In this manner, the author of the resource can specify which programs would be appropriate or capable of handling the content of the resource.

In one embodiment, the metadata module 304 checks metadata to determine the most recently used program to create, view, read, or otherwise open or access the resource. In some embodiments, the program module 206 uses the most recently used program to open the selected resource, if available on the system being used. In certain embodiments, the most recently used program may be device, system, user, or operating system specific. For example, user A may have used program A to open the resource, but user B may have used program B most recently to open the resource. Thus, if user A tries to open the resource again, the program module 206 may use program A to open the resource even though program B was used most recently. Similarly, if the resource was opened most recently using program C on an iPhone®, but was opened previous to that using program D on a Windows® laptop, if the resource was selected again to be opened on the Windows® laptop, the program module 206 may open the resource with program D instead of program C.

In one embodiment, the metadata module 304 checks metadata to determine the program that was used to create the resource. The program module 206, in some embodiments, opens the resource using the program that was used to create the resource. In certain embodiments, the program the created the resource may be the best program to use to open the resource for viewing, editing, or the like.

In one embodiment, the metadata module 304 checks metadata to determine a storage location (e.g., directory) of the selected resource. In such an embodiment, the program module 206 determines a program to open the resource based on the location of the selected resource. In one embodiment, the metadata also indicates one or more programs that have been predefined to open resources located at a particular location. For example, the metadata module 304 may determine that image files located in the "/usr/image_projects" directory may be opened with Photoshop® while images located in the "/usr/family_pics" directory may be opened with a different image viewer application. Similarly, the metadata module 304 may determine that hyperlinks located in the "/usr/chrome" directory (e.g., URLs, hyperlinks located within a resource, or the like) may be opened with Google Chrome® while hyperlinks located in the "/usr/safari" directory may be opened with Safari®.

In such an embodiment, the metadata for a directory may include a listing of preselected programs that may be used to open resources of a certain type, resources that contain content of a particular type, resources that have a certain extension, or the like. In this manner, the program module 206 may determine an appropriate program to use to open the resource on a per-directory basis, e.g., according to the directory, or similar location, where the resource is stored. Likewise, the program module 206 may determine a program to use to open the resource on a per-resource basis, a per-storage device basis, a per-system basis, a per-device basis, or the like, as indicated by the data stored in the metadata.

For example, in one embodiment, the metadata module 304 may check metadata to determine if a file has a pre-assigned or designated program that should be used to open the file. A user, for example, may designate a particular program as the default program for the file when the file is opened. In such an embodiment, two different *.doc files may be opened in two different programs, even though the files have the same extension. In another embodiment, the metadata module 304 may check metadata to determine a program that should be used to open resources that include various content on a particular operating system or device. For example, if a text file is accessible on various devices running different operating system, such as a text file stored in the cloud or other network/remote location, the metadata module 304 may determine from the metadata that the text file should be opened on a device running Microsoft Windows® using Microsoft Word® and the text file should be opened on a device running a Linux® distribution using OpenOffice®.

Metadata associated with resources stored in the cloud may also include program information for each device, user, operating system, etc., used to open the resource. For example, the metadata may include a list of most recently used programs used to open the file for each device, each user that accessed the device, or the like. Accordingly, based on the device, user, operating system, etc., that is used to open the file, the metadata module 304 may read or receive data from the metadata that indicates which program(s) should be used to open the file. The metadata, in such an embodiment, may be stored in the cloud, on each device, or the like. For example, metadata stored with the file in the cloud may point to a location of metadata stored locally on the device.

The metadata may contain various data fields that may be used by the program module 206 to determine a program to open the resource. For example, the metadata may contain data about the content within a file, where the file is located, the most recently used program to open the file, the author of the file, etc. In such an embodiment, the metadata module 304 and/or a user may assign weights, rankings, values, priorities, etc., to the metadata fields in order to determine which of the fields should be given preference. For example, a user may specify that a particular file should be opened with a rich-text editor, such as Microsoft Word®, even though the file does not contain formatted text or images. The program module 206, based on the content of the resource may determine that a basic text editor would be the most appropriate program to open the resource, but may give deference to the user-defined program indicated in the metadata.

In some embodiments, the program module 206 may combine multiple characteristics of the resource to determine a program to open the resource. For example, the metadata module 304 may determine that a selected image file was selected by the author of the file, and was designated to be opened in Photoshop. Therefore, the program module 206 may open the program in Photoshop® in an editing mode because the author of the file is the user requesting to open the file.

In one embodiment where the resource comprises a hyperlink, the metadata module 304 checks metadata associated with the hyperlink to determine which program to use to open the hyperlink. As used herein, a hyperlink is a reference that directs a user to data, or causes an action to be performed, by clicking or otherwise interacting with the hyperlink. A hyperlink may include a web address, an email address, a phone number reference, an FTP address, a link to a file or location within a file, or the like.

In some embodiments, the metadata for a hyperlink includes a program that should open the hyperlink. For example, in a traditional system, a hyperlink for a URL may be opened in Internet Explorer® if Internet Explorer® is set as the default web browser on the system. However, the web page at the URL may not be rendered as well in Internet Explorer® as it would be in Google Chrome®. Thus, as described herein, the metadata for a hyperlink may specify that the location referenced by the hyperlink is supposed to be opened in Google Chrome® while metadata for a different hyperlink may specify that the location is supposed to be opened in Internet Explorer®. The metadata for a hyperlink may be stored and managed by an operating system, such as in a registry, in a file, in a log, in a database, or the like. The metadata regarding the programs used to open a hyperlink may be user-defined, may be based on a most recently used program list, may be based on the currently available programs, may be based on the content of the location referenced by the hyperlink, may be based on the type of hyperlink, or the like.

Figure 4:
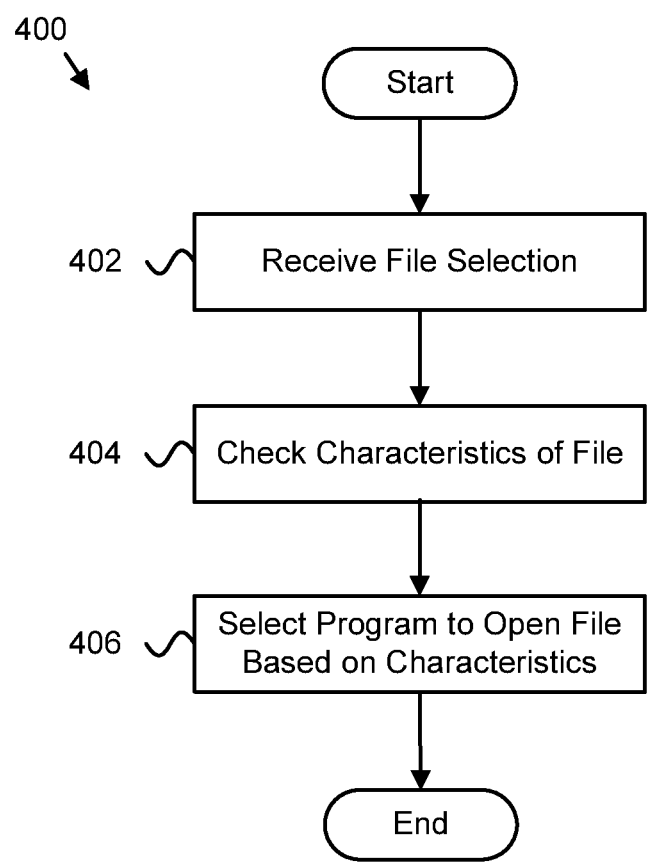
FIG. 4 is a schematic flow chart diagram illustrating one embodiment of a method for context-based program selection.

FIG. 4 is a schematic flow chart diagram illustrating one embodiment of a method 400 for context-based program selection. In one embodiment, the method 400 begins and receives 402 a resource selection. The resource selection, in one embodiment, may be received 402 in response to a user selecting a resource to be opened (e.g., by double-clicking, tapping, or the like). In a further embodiment, the method 400 checks 404 one or more characteristics of the selected resource, such as the content of the resource and/or various metadata associated with the resource. In one embodiment, the method 400 selects 406 a program to open the resource based on the characteristics of the resource, and the method 400 ends. In some embodiments, the resource module 202, the characteristic module 204, and the program module 206 perform the various steps of the method 400.

Figure 5:
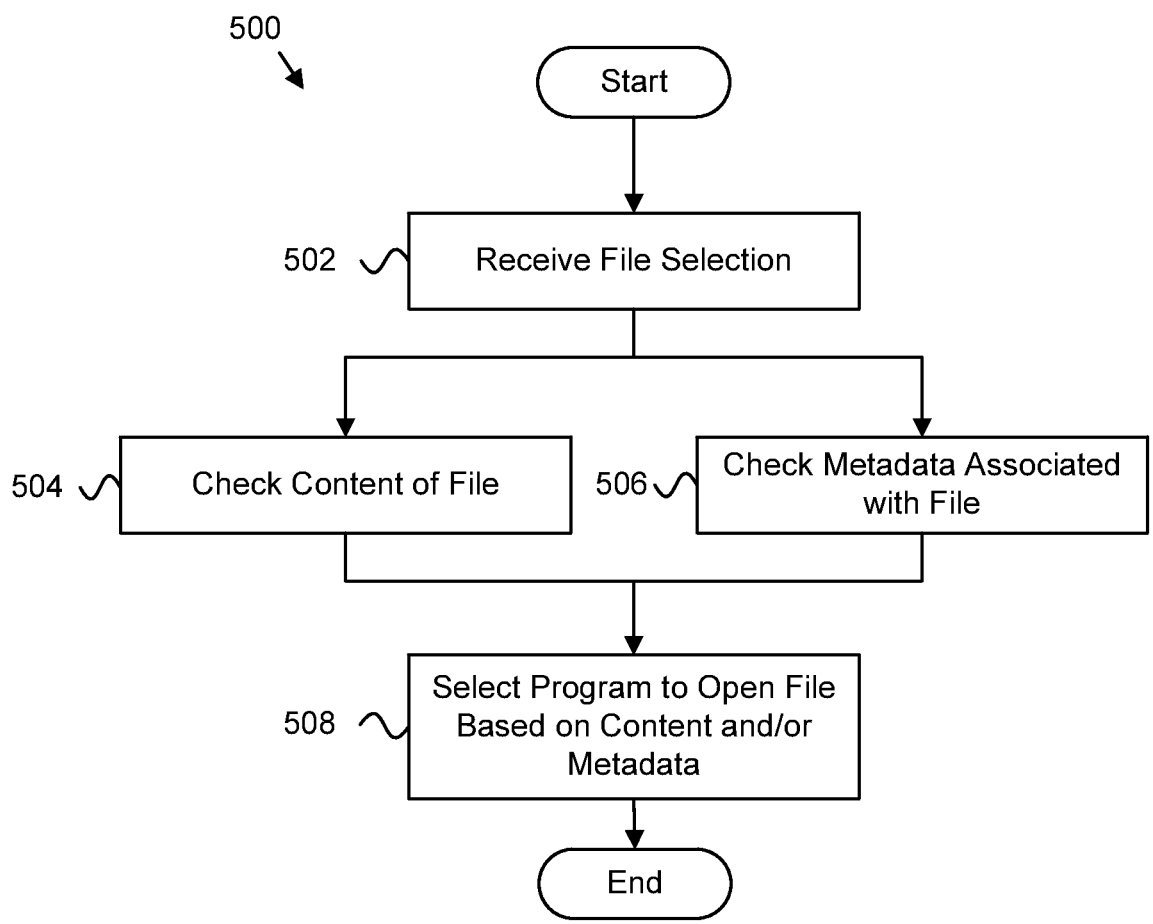
FIG. 5 is a schematic flow chart diagram illustrating one embodiment of another method for context-based program selection.

FIG. 5 is a schematic flow chart diagram illustrating one embodiment of another method 500 for context-based program selection. In one embodiment, the method 500 begins and receives 502 a resource selection. The method 500, in a further embodiment, checks 504 content within the resource to determine types of content that the resource contains. For example, a text file may contain formatted text, unformatted text, tables, graphics, videos, music, etc. Based on the types of content in the resource, the method 500 selects 508 a program to open the resource, and the method 500 ends.

The method 500, in certain embodiments, after receiving 502 the resource selection, checks 506 metadata associated with the resource, and selects 508 a program to open the resource based on the metadata. The metadata, for example, may specify an author/creator of the resource, a storage location of the resource, most recently used programs to open the resource, a program designated as the default program for the resource, or the like. And the method 500 ends. In some embodiments, the resource module 202, the characteristic module 204, including the content module 302 and the metadata module 304, and the program module 206 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
      process a resource to identify one or more types of content within the resource, the one or more identified types of content stored in metadata associated with the resource;
      receive a selection of the resource;
      check at least one characteristic of the resource stored in metadata associated with the resource, the at least one characteristic comprising the one or more identified types of content, an identifier for an author of the resource, a program selected by the author for opening the resource, and a storage location for the resource;
      automatically select the author-selected program to open the resource based on the one or more identified types of content within the resource and the storage location for the resource; and
      open the resource in the selected program in a mode that has elevated privileges in response to determining that the identifier for the author of the resource matches an identifier for a user opening the resource.

2. The apparatus of claim 1, wherein the program selected to open the resource comprises a program selected by a user to open resources that comprise content of a predefined type.

3. The apparatus of claim 1, wherein the resource is opened in the selected program in edit mode in response to the resource being selected by the author of the resource and the resource is opened in the selected program in read-only mode in response to the resource being selected by a different user.

4. The apparatus of claim 1, wherein the memory further comprises code executable by the processor to determine, from the metadata, a program that was used to create the resource, the program that was used to create the resource being selected to open the resource.

5. The apparatus of claim 1, wherein the memory further comprises code executable by the processor to determine, from the metadata, a most recently used program used to open the resource, the program selected to open the resource comprising the most recently used program.

6. The apparatus of claim 1, wherein the memory further comprises code executable by the processor to determine, from the metadata, a program designated as the selected program to open the resource.

7. The apparatus of claim 1, wherein the memory further comprises code executable by the processor to determine, from the metadata, the program selected to open the resource based on one or more of an operating system and a device that is used to select the resource.

8. The apparatus of claim 1, wherein the resource comprises a hyperlink and the memory further comprises code executable by the processor to determine, from the metadata associated with the hyperlink, a program selected to open the hyperlink.

9. The apparatus of claim 1, wherein the content within the resource comprises one or more of:
   images;
   formatted text;
   unformatted text;
   videos;
   source code; and
   hyperlinks.

10. A method comprising:
    processing, by use of a processor, a resource to identify one or more types of content within the resource, the one or more identified types of content stored in metadata associated with the resource;
    receiving a selection of the resource;
    checking at least one characteristic of the resource stored in metadata associated with the resource, the at least one characteristic comprising the one or more identified types of content, an identifier for an author of the resource, and a program selected by the author for opening the resource;
    automatically selecting the author-selected program to open the resource based on the at least one characteristic of one or more identified types of content within the resource; and
    opening the resource in the selected program in a mode that has elevated privileges in response to determining that the identifier for the author of the resource matches an identifier for a user opening the resource.

11. The method of claim 10, wherein the program selected to open the resource comprises a program selected by a user to open resource that comprise content of a predefined type.

12. The method of claim 10, wherein the resource is opened in the selected program in edit mode in response to the resource being selected by the author of the resource and the resource is opened in the selected program in read-only mode in response to the resource being selected by a different user.

13. The method of claim 10, further comprising determining, from the metadata, a program that was used to create the resource, the program that was used to create the resource being selected to open the resource.

14. The method of claim 10, further comprising determining, from the metadata, a most recently used program used to open the resource, the program selected to open the resource comprising the most recently used program.

15. The method of claim 10, further comprising determining, from the metadata, a program designated as the selected program to open the resource, the designated program based on one or more of an operating system and a device that is used to select the resource.

16. A program product comprising a computer readable storage medium that stores code executable by a processor, the executable code comprising code to perform:
    processing a resource to identify one or more types of content within the resource, the one or more identified types of content stored in metadata associated with the resource
    receiving a selection of the resource;
    checking at least one characteristic of the resource stored in metadata associated with the resource, the at least one characteristic comprising the one or more identified types of content, an identifier for an author of the resource, and a program selected by the author for opening the resource;

automatically selecting the author-selected program to open the resource based on the at least one characteristic of one or more identified types of content within the resource; and opening the resource in the selected program in a mode that has elevated privileges in response to determining that the identifier for the author of the resource matches an identifier for a user opening the resource.

\* \* \* \* \*